March 20, 1973  D. S. ST. JOHN  3,721,312

RADIATION TRANSLATION BY ROTARY TRANSDUCER SCANNING

Filed May 1, 1969  6 Sheets-Sheet 2

March 20, 1973  D. S. ST. JOHN  3,721,312
RADIATION TRANSLATION BY ROTARY TRANSDUCER SCANNING
Filed May 1, 1969  6 Sheets-Sheet 3

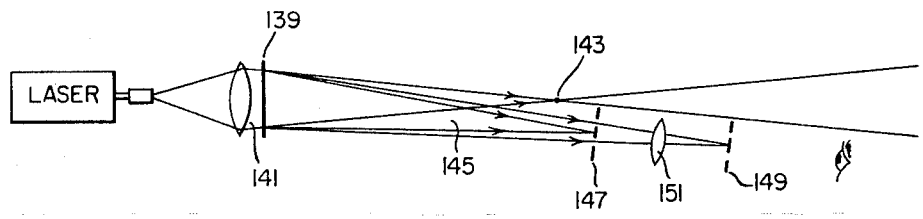
Fig. 10
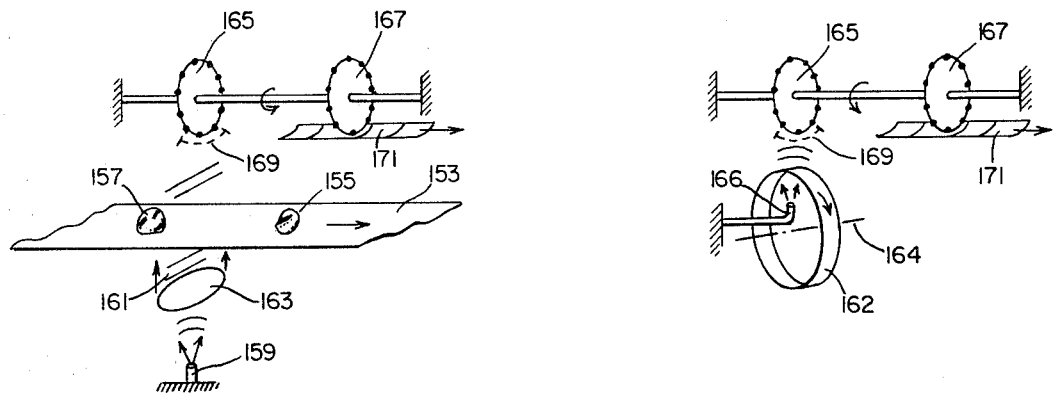
Fig. 11
Fig. 11A
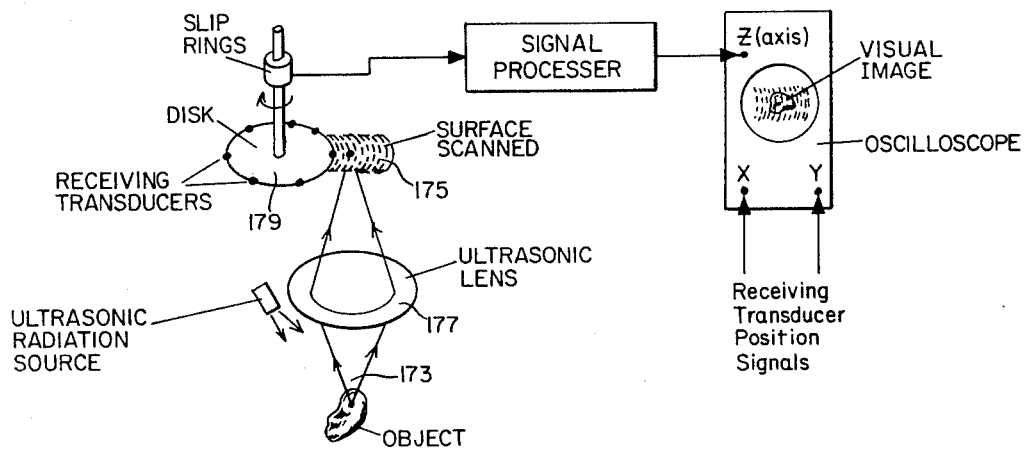
Fig. 12

March 20, 1973  D. S. ST. JOHN  3,721,312
RADIATION TRANSLATION BY ROTARY TRANSDUCER SCANNING
Filed May 1, 1969  6 Sheets-Sheet 5

3,721,312
RADIATION TRANSLATION BY ROTARY
TRANSDUCER SCANNING
Daniel S. St. John, Hockessin, Del., assignor to
Holotron Corporation
Filed May 1, 1969, Ser. No. 820,862
Int. Cl. G01h 9/00
U.S. Cl. 181—.5 R                33 Claims

ABSTRACT OF THE DISCLOSURE

A method and apparatus for scanning a radiation field carrying information of an object with one or more point transducers attached to a circular disk which is rotated for the transducer or transducers to scan out a desired surface of the radiation field. The specific systems disclosed translate acoustic energy into light energy having a corresponding wavefront, thereby to give a visual image of the ultrasonic wavefront scanned. Both holographic and non-holographic imaging systems utilizing various forms of the rotary point transducer scanner are disclosed. A technique for holographic imaging of a moving object by scanning a point receiver along a line is also disclosed.

BACKGROUND OF THE INVENTION

This invention relates generally to the art of forming a visible wavefront which is a replica in certain respects to an invisible radiation wavefront which is desired to be "seen." A common example of such a radiation translation is the illumination of a room or outdoor area with infrared electromagnetic radiation which itself is invisible, but its reflections are translated into visible radiation, so that the room or outdoor location may be viewed as seen by infrared radiation. Another example is the illumination with ultrasonic energy of an object wherein the wavefront reflected from or transmitted through the object is translated into the optical domain for viewing an image of the object as seen by ultrasound. The invention herein is described primarily in the environment of ultrasonic imaging since its greatest utility lies, at the present time, in such an application, but it is understood that the techniques of the present invention apply to any non-visible radiation illumination of an object scene.

In its broadest sense, the term "radiation" is defined as propagating energy. The particular form of the energy may be, for example, particle radiation, such as an electron beam, or electromagnetic radiation, such as light, or acoustic radiation, such as ultrasonic energy. In the broadest sense, the sonic frequencies utilized in "ultrasonic imaging" are not limited to any particular range, but include the entire spectrum of compressional wave energy. However, in the more practical embodiments of that technique, it has been found that the higher sonic frequencies (i.e. those considerably above the audible range) are much more desirable than the lower sonic frequencies. For this reason, instead of utilizing the more general term "compressional wave energy" in this description, the term "ultrasonic enregy" is utilized.

Visualization of ultrasonic wavefronts or fields passing through objects has previously been employed to study the properties of such objects and to determine the existence of flaws or defects. A continuous ultrasonic wavefront is generated by an appropriate source which forms an ultrasonic beam for passing through the object. The object then modifies the beam, according to its interaction characteristics with the particular ultrasonic frequency being utilized to form an object modified ultrasonic beam which carries information of the object. Visualization of reflected ultrasonic wavefronts or fields has also been employed to detect the presence of objects in a large body of water which cannot be visualized directly. In either case, the ultrasonic energy beam, after modification by the object, carries information thereof which is desired to be visualized, thereby requiring translation from the ultrasonic to the optical domain.

There are two basic known techniques for making this translation, one which is referred to as "direct imaging," and the other the more recently developed holographic imaging technique. In the techniques of direct imaging, the ultrasonic wavefront modified by the object is translated directly into the optical domain at a detecting surface. An ultrasonic shadow image of the object may be cast onto the detecting surface but it is usually preferable to image thereon a desired plane within the object to be investigated by the use of an ultrasonic lens. To look at a different plane of the object, the characteristics of the ultrasonic imaging system have to be changed appropriately. An example of such direct imaging is illustrated by Hueter and Bolt in Sonics, page 353, published by Wiley in 1955. The detector shown therein is the well known Pohlman cell, where particles are suspended within a liquid and are realigned according to the distribution of energy across the object modified ultrasonic wavefront striking it. When the detector cell is illuminated with light, the orientation of these particles renders an optical image of the object. Since the visual indication is responsive only to the intensity of the various portions of the ultrasonic beam striking the Pohlman cell, there is not a complete translation of the object modified ultrasonic wavefront into a light radiation wavefront.

The technique of ultrasonic holography provides a more complete translation by translating the phase as well as the intensity distribution across the object modified ultrasonic energy into a light wavefront. A three-dimensional optical image is formed of the object as seen by the ultrasound which allows the viewer to focus upon any plane of the object desired to be viewed. Information from which such a three-dimensional reconstruction is possible is obtained by comparing the phase of the object modified radiation with a reference ultrasonic beam coherent with the beam illuminating the object. This is performed in one form by interfering a reference ultrasonic beam with the object modified beam at a liquid-air interface detector to form a standing wave pattern which diffracts illuminating light into image carrying diffracted orders to form a three-dimensional image of the object. The principles of ultrasonic holography are described with respect to this particular embodiment in copending patent application S.N. 569,914, filed Aug. 3, 1966. Refinements of the technique are disclosed in copending patent application S.N. 730,260 filed May 20, 1968, issued June 22, 1971 as U.S. Pat. No. 3,585,847.

The aforementioned Pohlman cell is useful in many circumstances but does have a disadvantage in others. An image is slow in forming so a Pohlman cell is impractical to translate moving object ultrasonic fields. Additionally, a Pohlman cell is mechanically unstable since the particles tend to settle within the trapped liquid. The liquid-air interface is of low utility as a detector in a direct imaging system because of a very non-linear translation from the ultrasonic to the optical domains. The liquid-air interface is, however, a very satisfactory detector for good quality real time holographic imaging, but is mechanically unstable so is limited to use in testing and laboratory environments where the detector may be held horizontal and very still. Furthermore, the liquid-air interface is not good for long wavelengths in excess of 1 mm.

Other known detecting systems convert the object modified ultrasound into electrical signals by the use of one or more ultrasound transducers as the detector, with the added step of converting the electrical signal into a visual image to effect the ultrasound to light translation. Such a device is an ultrasonic camera which includes a transducer sheet or a plurality of individual transducers, usually a piezoelectric crystal, for detecting an ultrasonic radiation field. An electron beam scans the transducer in a manner similar to that of a television camera tube to read off its charge. A television display monitor may then be used to display an optical representation of the ultrasonic wavefront striking the transducer. If such a device is used in a direct imaging system, an image of the object will appear on the television monitor directly. If the device is used as a hologram detector, an interference pattern will be displayed on the television monitor which is photographed to make a permanent hologram which may be later illuminated in a manner to form the image carrying diffractive beams for viewing a three-dimensional image of the object. Ultrasonic cameras are described in an article entitled "Ultrasonic Image Camera," in Engineer, 207,348 (Feb. 27, 1959) and in various forms in several United States patents such as Pat. Nos. 2,899,580 and 3,213,675. Although such a detector provides rapid scanning of an area, it suffers from its high cost and delicate nature, as well as having relatively poor resolution capabilities which usually makes the ultrasonic camera an undesirable detector in holography. Furthermore, the acceptance angle of the ultrasonic wave with respect to the piezoelectric crystal is limited and the necessity for a vacuum on the inside of the crystal face limits the practical size of the scanning area and thus the ultrasonic camera is limited to the formation of small images and to the use of short wavelengths.

Another technique for detecting object modified ultrasonic energy by first converting to electrical signals is to place an array of very small detectors throughout a surface area through which an object-modified beam passes. Patent No. 2,453,502 illustrates such a technique in direct imaging wherein the transducer array is scanned by rotary switches and an image formed on an oscilloscope with synchronous electron beam scanning. An array of transducers in ultrasonic holography is described in Patent No. 3,400,363 wherein each small detector in the ultrasonic array energizes a point light surface of a luminous array to form a hologram. In such an ultrasonic holography method, the necessary phase information can be obtained by comparing the phase of the object modified ultrasonic wave at each detector with that of a suitable reference electrical signal of the same frequency as that used to produce the ultrasonic wave that irradiates the object. An array of small transducers is useful in many circumstances but does have the disadvantage that if high resolution is required a very large number of transducers must be placed very close together, which can require thousands of such transducers for a simple ultrasonic direct imaging or holographic apparatus with a detecting area of useful size.

Another known technique in direct imaging is to use a line of point detectors and scan the imaging reflector in a manner to move an image of the object over the line of small transducers. This is disclosed in Pat. No. 3,067,281. This system of detection suffers from mechanical problems in repetitively scanning the image.

An early proposal for direct imaging of object modified ultransonic energy was to scan an apertured disk in front of a single transducer extending over the entire detecting area. Only part of the image energy passes through a disk opening to strike the transducer at any given instant. This technique is described in Pat. No. 2,164,125. A somewhat similar scanning system for microwave to visual translation is described in Pat. No. 2,711,440. A television system using apertured disk scanning is disclosed in Pat. No. 2,028,475. A problem with this technique is its poor image resolution capability.

As an alternative to detecting object modified radiation in holography over the entire surface area instantaneously, a technique is known wherein a substantially point transducer is scanned over a defined surface area. The ultrasonic field may then be reconstructed in the optical domain according to the scanning pattern. This technique is disclosed more fully by Preston and Kreuzer, in Applied Physics Letters, volume 10, No. 5, 150–152 (1967) and is utilized in the description in Pat. No. 3,410,363. A technique wherein a substantially point source is scanned over a surface area relative to the object while a substantially point receiver remains fixed relative to the object is disclosed to obtain the same results as receiver scanning in copending patent application S.N. 662,736, filed Aug. 23, 1967, issued February 8, 1972 as U.S. Patent No. 3,640,598. Simultaneous scanning of the point receiver and point source relative to the object and a general apparatus for scanning over a surface area is disclosed in copending patent application S.N. 744,732, filed July 15, 1968, issued Jan. 4, 1972 as U.S. Pat. No. 3,632,-183. Non-holographic rectilinear scanning is shown in one form in Pat. No. 2,989,864. These scanning techniques and apparatus contemplate scanning back and forth in straight lines over the desired surface area (rectilinear scanning). Such a technique suffers from need for complex mechanical equipment capable of rapidly moving the source or receiver or both in two directions.

Therefore, it is a principal object of this invention to provide a technique for scanning an area with a reduced number of point radiation receivers that may be implemented by a simple mechanism.

It is also an object of this invention to provide a technique for translating a non-visual object modified radiation wavefront into the optical domain with high resolution capability and high speed.

It is additionally an object of this invention to provide a scanning apparatus for use in a portable ultrasonic direct imaging apparatus.

It is also an object of this invention to provide radiation translation apparatus with a high degree of mechanical stability.

It is a further object of this invention to provide an ultrasonic radiation translation technique that is useful over a wide frequency range.

It is a further object of this invention to provide a technique for inspecting a moving object with a simplified scanning technique.

SUMMARY OF THE INVENTION

These and additional objects of this invention are accomplished by a technique wherein one or more substantially point transducers (receivers) are scanned in arcuate paths. A single point transducer is affixed to a wheel (disk) which is constantly rotating. To scan out a two-dimensional surface area, relative motion is provided between the axis of the rotating wheel and the object scene. This movement is preferably parallel with or perpendicular to the axis of rotation of the wheel. The advantage of this type of scanning in comparison with rectilinear scanning is that the rotating wheel need be translated along only one direction in order to scan a single point receiver over a two-dimensional area. The driving mechanism is thereby much simpler than that required to scan a receiver in a series of straight lines over a two-dimensional area. Furthermore, circular scanning is faster than rectilinear scanning.

For direct imaging, the transducer scans an ultrasonic image of the object and may be electrically connected to a point light source or to a CRT, either of which is scanned in synchronism with the point receiver, thereby scanning out an optical object image. For holographic imaging, an electrical signal coherent with the object illuminating radiation source is mixed with the electrical signal from the receiver in order to apply holographic information of the object to either the scanning point light source or oscilloscope.

According to another aspect of the present invention, a plurality of transducers are placed around a constantly rotating wheel at a constant radius and equally circumferentially spaced. The total number of transducers necessary is still a small percentage of the number required to cover with a static transducer array an area of equivalent size to the scanned area. The advantage of utilizing a plurality of transducers is that the axial translation rate of speed can be increased by a factor equal to the number of receivers without reducing the raster density, as compared with the single transducer case. Therefore, the time required to scan a given surface area across an object modified radiation beam is reduced by the same factor. Alternatively, the speed of rotation of the wheel may be reduced by a factor equal to the number of transducers circumferentially located on the wheel while maintaining the axial translation speed for the same scanned raster density over a given detecting area in the same time, as compared with single transducer scanning. Maintaining reduced rotational speed in a liquid ultrasonic transmitting medium is desirable to keep down turbulence and ultrasonic wave distortion.

According to yet another aspect of the present invention, a single point receiver or a plurality of point receivers may be slideably mounted on a disk in a manner that when the disk rotates at a uniform speed, the receiver or receivers travel radially across the disk. The advantage to this circular scanning technique is that the rotating disk need not itself be moved in order to scan a two-dimensional surface area relative to an object. A preferable form of such a rotary scanner includes a row of point receivers mounted and uniformly spaced along a radial line of a rotary disk with means to move the row outward away from the axis of rotation a distance equal to the spacing between the receivers during a number of revolutions of the disk. The amount of time this movement takes in terms of a number of disk revolutions determines the density of raster lines (resolution). High resolution is required for holographic scanning but a lower resolution is generally acceptable for direct imaging.

In a preferred direct imaging scanning system, a row of receivers is arranged along a radial line of a rotating disk with enough receiving transducers for spacing them to be at uniform intervals equal to a desired minimum resolution capability of the imaging system but still with only a small percentage of the number of point receivers that would be required in a two-dimensional array. A single revolution of the disk scans a defined detecting area as large as the disk without necessity for axial translation. The transducer array may be designed to be moved radially, in a manner described hereinabove, whenever greater resolution is desired. This type of scanner is conveniently used in an underwater ultrasonic viewer in conjunction with a variable focal length ultrasonic lens and an oscilloscope for displaying the image.

According to a further aspect of the present invention, a moving object may be holographically imaged by scanning a point receiving transducer in a line which is substantially perpendicular to the direction of movement of the object. A radiation source fixed relative to the receiver scanning line illuminates the passing objects. This method is especially useful for the examination of production items moving along a path by some means such as a conveyor. If a hologram is constructed in the normal manner from the signals of the point receiver, an image is reconstructed by illuminating the hologram in a normal manner with light and placing appropriate optics in an image carrying diffracted beam to correct for astigmatism and unequal magnification in the two lateral directions of the image.

However, it has been found that if the radiation striking the moving object is collimated, the correcting optics are unnecessary because a good image is reconstructed directly from the hologram. Preferred apparatus for carrying out the scanning of a receiver over a line is a constantly rotating wheel with a radiation receiver attached. The wheel need not be translated relative to its surroundings since the object movement provides the necessary relative motion for the receiver to scan out a two-dimensional area. For better resolution or to enable a slower rotating wheel speed, a plurality of transducers may be attached to the wheel at equal radii from the wheel axis of rotation.

For a more detailed understanding of the various aspects of the present invention, the following detailed description of a few specific forms thereof should be read in conjunction with the drawings.

BRIEF DESCRIPTION OF THE DRAWINGS

FIG. 10 shows one technique for reconstructing an image from a hologram constructed according to the techniques shown in FIG. 8.

FIGS. 11 and 11A show preferred forms of the aspect of the present invention illustrated with respect to FIG. 8.

FIG. 12 illustrates the receiver scanning wheel of FIG. 5 for use in a direct imaging system.

DESCRIPTION OF THE PREFERRED EMBODIMENTS

Figure 1:
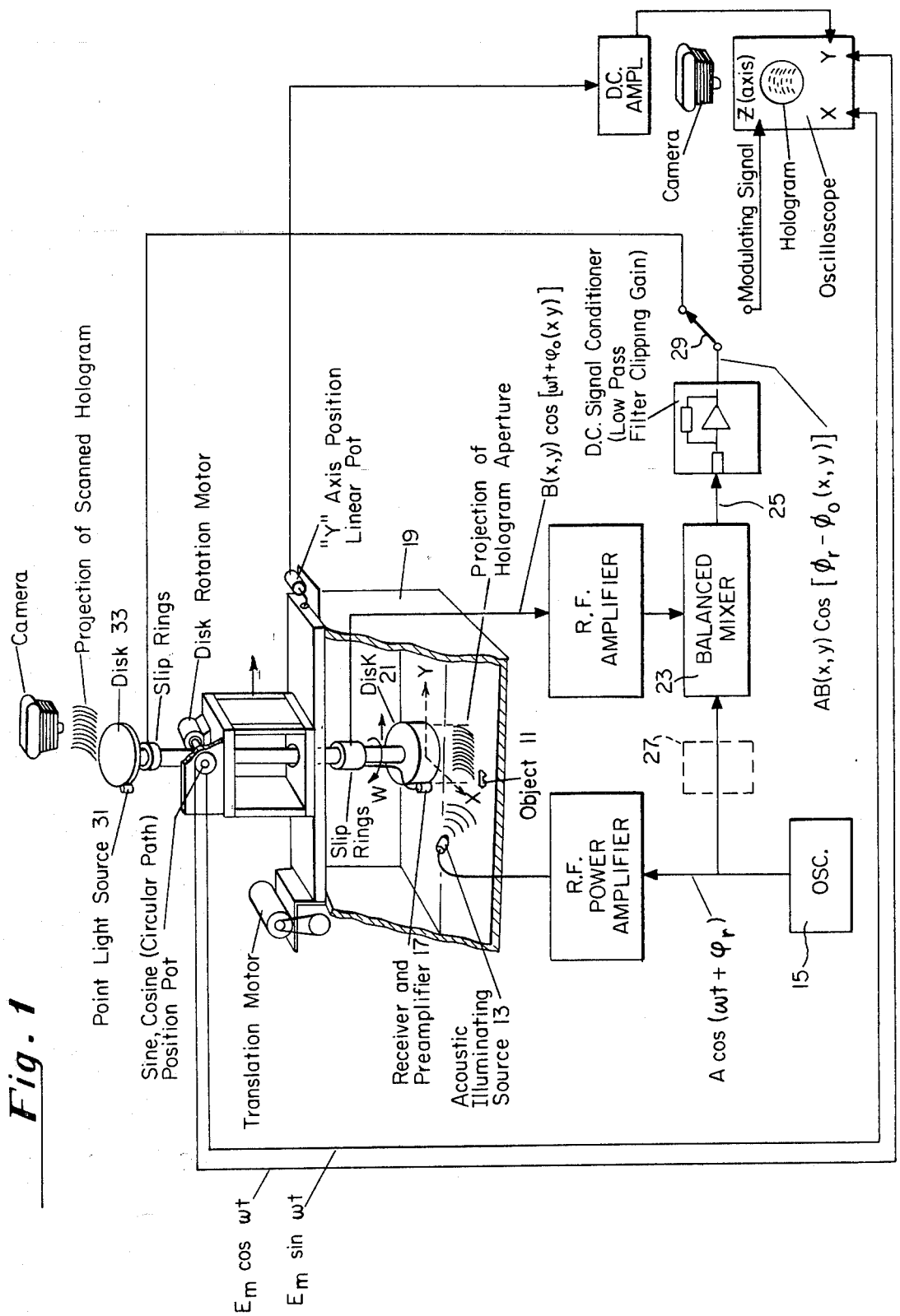
FIG. 1 illustrates in block diagram form the essential elements of a system for constructing a hologram of an object which utilizes a rotating disk for supporting a radiation receiver.

One form of a single transducer rotary scanning device is illustrated in FIG. 1 along with appropriate control mechanisms and an electronic signal processor to form a hologram of an object. An object 11 is illuminated with ultrasonic energy by a source 13 driven by an oscillator 15 and an appropriate amplifier. Illustrated herein is examination of the object by reflecting ultrasonic energy from the object and then detecting the object modified radiation by an ultrasonic receiver 17. It should be noted that the ultrasonic energy for certain applications may be directed from the source through the object and then as object modified radiation to the ultrasonic transducer.

A cross-sectional surface of the object modified radiation reflected from the object is scanned by the receiver 17. This cross-sectional area is a planar hologram aperture, a projection of which is drawn at the bottom of a liquid container 19. The receiver 17 is attached to a disk 21 which rotates at a constant angular speed W and which is translated in a single direction perpendicular to the disk axis of rotation. In this manner, a two-dimensional hologram aperture may be scanned by the receiver 17 by moving disk's axis of rotation in only one direction relative to the object under inspection. As is well-known, the size of the hologram aperture and its position relative to the object 11 determines the three-dimensional view of the object that may be had by optically reconstructing an image from the hologram constructed according to this technique.

The receiver includes an appropriate transducer responsive to ultrasonic energy to produce an electrical signal proportional to the ultrasonic signal which strikes it. The transducer should be substantially a "point"; that is, the size of the ultrasonic responsive transducer in the receiver is determined according to the resolution desired. For holographic imaging, the transducer must be small enough to detect phase as well as amplitude information. The electrical signal generated by the receiver is removed from the rotating disk by slip rings and then carried by appropriate electrical circuits, including necessary amplifiers, to a balanced mixer 23 wherein an electrical signal coherent with the object illuminating ultrasonic energy is mixed to produce an electronic signal output 25 which is an electrical analog of a hologram of the object. A type of phase sensitive detector is preferred for use as the balanced mixer 23, and a product detector type has been found to have many advantages for this application. The function of the balanced mixer 23 is to compare the phase and intensity of ultrasonic radiation detected by the receiver 17 with a coherent electrical signal. This is equivalent to non-scanned ultrasonic holographic systems wherein an ultrasonic reference beam is mixed with the object modified beam at the hologram aperture before detection. In order to construct an off-axis hologram, the object must lie outside an orthogonal projection of the hologram aperture, as shown in FIG. 1. Alternatively, if the object lies within a normal projection of the scanned hologram aperture, a phase shifting network 27 may be utilized to make the reference electrical signal applied to the balance mixer 23 equivalent to an off-axis reference beam. Such a signal processing technique in radiowave holography is described in the Proceedings of the IEEE, April 1967, pp. 570–571.

The holographic information electrical signal analog at 25 is additionally processed and then applied through a switch 29 to either an oscilloscope or a scanned point light source. If connected to the oscilloscope, the holographic information electrical analog is applied in a manner to control the intensity of the scanning electron beam. Input signals to the oscilloscope for controlling the electron beam scanning are developed by appropriate potentiometers attached to the receiver scanning mechanism that emit electrical signals proportional to the receiver position. The oscilloscope displays a hologram of the object 11 which is photographed by an appropriate camera. After development of the film, an image of the object 11 may be reconstructed in the optical domain, as hereinafter discussed.

Alternatively, the switch 29 may be connected through appropriate slip rings to a point light source 31 attached to a disk 33 which rotates in synchronism with the receiver scanning disk 21. The holographic information modulates the intensity of the light source 31 and an appropriate camera may record this intensity variation on its film to produce a hologram from which an image may be reconstructed in the optical domain, as hereinafter discussed.

It may be noted that the scanning system illustrated in FIG. 1 contemplates that the point light source 31 shall be recorded only during a portion of its circular path as it passes through the defined hologram aperture. The receiver 17 is scanned in a plane relative to the object 11 in a curved raster pattern thereacross. The curved raster has the advantage that during image reconstruction high orders of diffracted light, normally present in reconstruction of a hologram constructed with a straight line raster, are reduced.

As is well known in ultrasonic holography, ultrasonic energy is easily reflected if directed at solid objects through air, so a liquid ultrasonic transmitting medium contained by tank 19 is generally utilized in which the object and receiver are submersed for proper ultrasonic energy coupling. Water is generally used for most ultrasonic examination applications. Since the receiver is being rotated in a liquid, the speed of rotation must be limited to a level which does not cause so much stirring of the liquid that the ultrasonic object modified radiation is distorted before being detected by the receiver.

Figure 2:
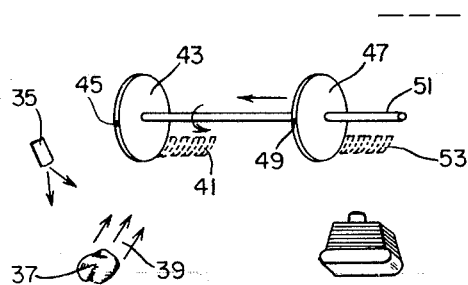
FIG. 2 illustrates an orientation of the receiver scanning wheel which is distinct from that shown in FIG. 1.

Instead of translating the rotating radiation receiving disk in a direction perpendicular to its axis, the receiver may be oriented on the disk so that the disk may be translated in a direction parallel with its axis of rotation. Such a modification is illustrated in FIG. 2 wherein a radiation source 35 illuminates an object 37 from which an object modified radiation beam 39 strikes a hologram aperture 41 to be scanned. A rotating disk 43 carrying a point receiver 45 scans the defined hologram aperture 41 and produces an electrical signal which is processed in the same manner as illustrated in FIG. 1. If it is desired to form a hologram by scanning a light source over an area to be photographed, a disk 47 carrying a point light source 49 is affixed to a drive shaft 51 which rotates the disk 43. The hologram aperture surface 41 scanned herein and the surface 53 upon which the hologram is visually constructed is curved. To prevent any distortions arising from using a curved hologram aperture, the receiver 45 should be operative over only a small part of the total circumference of the wheel 43 in order that the surface 41 approximate a flat surface. Alternatively, the hologram recorded on the film can itself be curved and an image reconstructed therefrom while curved.

Figure 3:
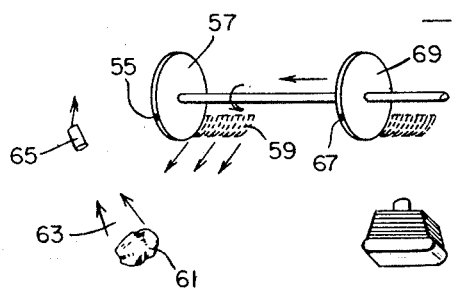
FIG. 3 illustrates the technique using the scanning wheel of FIG. 2 to support a radiation point source which is scanned over a surface area.

As described more fully in the aforementioned copending application S. N. 662,736, the equivalent to receiver scanning is source scanning. The techniques of the present invention are equally applicable to source scanning, illustrated in one form in FIG. 3. A point radiation source 55 is attached to a disk 57 for rotation therewith. The disk is translated in a direction parallel with its axis of rotation so that the source scans out a hologram aperture surface area 59. The radiation source 55 is driven by suitable power oscillator means and is gated so that it emits radiation only while traveling across the defined hologram aperture 59. Radiation so emitted is modified by an object 61 into an object modified beam 63 which is detected by a substantially point radiation receiver 65. The electrical signal from the receiver 65 is processed in a manner similar to that illustrated in FIG. 1 for driving either an oscilloscope or the point light source 67 which is attached to a disk 69 driven in synchronism with the source carrying disk 57.

It should be noted that there are certain disadvantages in source scanning holography since it is difficult to generate enough ultrasonic energy for proper imaging with a source of small area and also requires heavy electrical power to be transmitted from an oscillator to the source. Even so, there are certain applications where source scanning is preferred over receiver scanning, such as a condition where it may be difficult to position a receiver scanning mechanism or where the desired scan aperture is in a region where the environment would adversely affect the operation of the receiver. Furthermore, any disturbances caused in the ultrasonic transmitting liquid by the scanning mechanism is less likely to affect the ultrasonic signal received.

Figure 4:
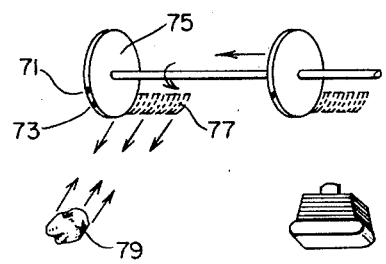
FIG. 4 illustrates the scanning wheel of FIG. 2 utilized with both a source and receiver attached thereto for simultaneous source and receiver scanning.

Another alternative for certain scanning operations is to rotary scan both the receiver and the source relative to the object according to the simultaneous source-receiver scanning techniques described in aforementioned copending patent application S.N. 744,732, and which is reported by the inventors therein in an article "Holography by Scanning" appearing in the Journal of the Optical Society of America, vol. 59, No. 1, pp. 1-6 (January 1969). One limiting case of simultaneous source receiver scanning by circular disks is illustrated in FIG. 4 wherein a source 71 and a receiver 73 are attached to a common disk 75 for scanning substantially the same hologram aperture 77 relative to an object 79. Such locked source and receiver scanning generates a hologram which reconstructs an image of the object that appears magnified and closer to the hologram and that has increased resolution relative to the image obtained by FIGS. 2 and 3.

Figure 5:
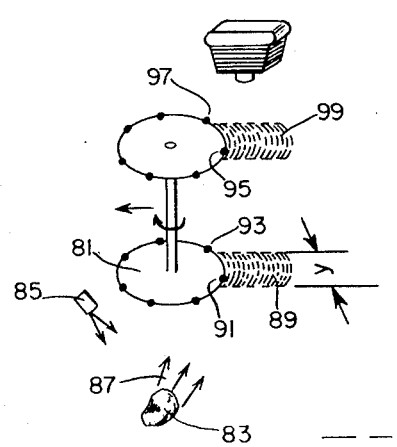
FIG. 5 illustrates the scanning wheel of FIG. 1 modified to include a plurality of radiation receivers spaced around the circumference of the wheel.

Various applications of rotary scanning in holography have been illustrated with a single source or receiver attached to a rotating disk. It can be seen that the time from which a source or receiver leaves one side of a scanned hologram aperture area and then enters this area from the opposite side thereof during a single revolution is wasted time insofar as obtaining holographic information of an object is concerned. Therefore, to improve this efficiency, a plurality of sources or receivers may be mounted around the circumference of the disk. Illustrated in FIG. 5 is a scanning disk 81 with a plurality of point receivers around its rim. An object 83 is illuminated by an appropriate ultrasonic source 85 to generate object modified radiation 87 which passes through a defined hologram aperture 89 for detection. As is well known, the size of the hologram aperture 89 in its position relative to the object 83 is chosen to give a desired field of view of the object in an image thereof upon reconstruction of the hologram with light.

A hologram aperture 89 is given herein a dimension designated $y$ across which the receivers are scanned. Shown in FIG. 5 is a point receiver 91 within the hologram aperture. In one form, the receivers may be spaced around the rim of the disk 81 a distance $y$ from each other so that when one receiver, such as receiver 91, is rotated out of the hologram aperture 89, another receiver, such as receiver 93 takes over and scans another line across the hologram aperture. To record the hologram, each receiver may be connected by appropriate electronics similar to that described with respect to FIG. 1 to its own point light source. For instance, the receiver 91 would energize a point light source 95 and a receiver 93 would energize a point light source 97 through independent electronic signal processing equipment. Means may be provided in the electronic circuits for energizing each light only while its respective point receiver is within the hologram aperture 89, in order to scan out a hologram 99 in light. Alternatively, a mask could be placed between the camera and the scanning point light sources having an opening the size of the hologram 99 which would allow light from each point light source to pass to the camera only while within this hologram area. Still another alternative is to display the holographic information obtained by each point receiver on an oscilloscope which would require an electronic switching network so that the electron beam intensity control input of the oscilloscope is connected to only one point receiver at a time as it scans across the hologram aperture 89.

Figure 6:
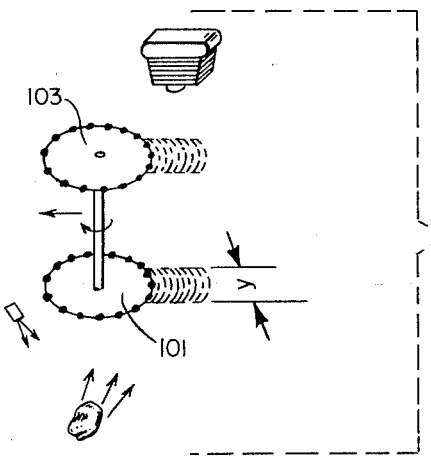
FIG. 6 illustrates the scanning wheel of FIG. 1 as shown in FIG. 5 with additional receivers added around the circumference of the disk.

It can be seen that the multiple receiver configuration as illustrated in FIG. 5 has the advantage over a system using only a single receiver that a given hologram aperture may be scanned with the same resolution (that is, same distance between scanning lines) and at the same speed of rotation but in much less time since translation velocity of the scanning wheel may be increased according to the number of receivers employed. Alternatively, the translational speed may remain the same and the speed of rotation reduced to scan a given hologram aperture area with the same resolution as can be obtained with a single receiver scanning system. To increase these advantages, a system utilizing an even greater number of receivers around the circumference of a disk may be used wherein more than one receiver occurs along the circumference within the distance $y$, the distance across the designated hologram aperture. Referring to FIG. 6, such a system is shown wherein a large number of receivers is attached to a scanning disk 101 and a corresponding number of point light sources attached to a disk 103. Such a system would otherwise be as described with respect to FIG. 5 except that if an oscilloscope is used for displaying a hologram for recordation, either a multiple electron beam CRT must be used or a single beam CRT with some kind of electronic sampling. This modification is necessary since more than one of the radiation receivers will be operative in a given instant within the scanned hologram aperture.

Figure 7:
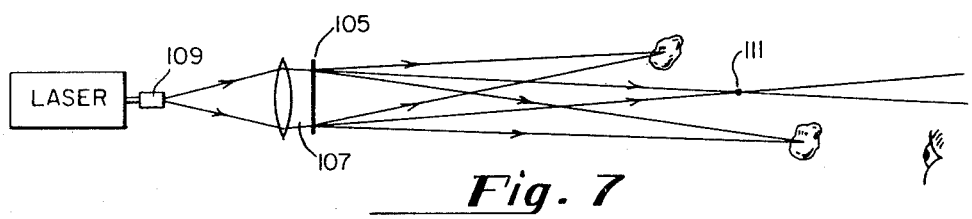
FIG. 7 shows one technique for reconstructing three-dimensional images of the object from a hologram constructed according to any of the techniques of FIGS. 1–6.

Once a hologram is constructed according to one of the techniques hereinabove described, optical images of the object as seen by ultrasonic energy may be reconstructed therefrom by a well known technique such as that shown in FIG. 7. The developed photographic film hologram 105 is placed in a slightly converging coherent light beam 107 which is generated by an appropriate laser whose narrow pencilled beam is expanded by a beam expander 109. The zero-order, or undiffracted light, will then come to a focus at some point 111 depending upon the degree of convergence given to the illuminating beam 107. On either side of this zero-order focus is an optical image of the object in first order diffracted light beams which may be viewed by placing the eye in one of the diffracted light beams. An alternative method of reconstructing an optical image from an ultrasonic hologram is described in the aforementioned copending patent application Ser. No. 569,914 wherein a substantially collimated light beam illuminates the hologram with a desired image carrying diffracted first order light beam being separated from the other first order beam and from the zero-order beam by the technique of spatial filtering. The spatial filtering technique includes bringing the various orders of light to focus by the use of an appropriate lens and blocking the undesired orders of light.

According to another aspect of the present invention, an improved technique for obtaining holographic information of a moving object is illustrated with respect to FIGS. 8-11. The specific arrangements disclosed in FIGS. 8, 8A, 9 and 10 are disclosed and claimed in application Ser. No. 29,784, filed Apr. 20, 1970 by Bernard P. Hildebrand now Pat. No. 3,655,258 issued Apr. 11 1972. The principle of the technique may be understood by reference to FIG. 8. Consider a conveyor belt 113 moving an object 115 through a holographic object examination location. This object may be a production item desired to be examined for flaws by ultrasonic energy. An ultrasonic radiation source 119 fixed relative to the surroundings illuminates the object on the conveyor belt moving relative thereto. A substantially point receiver 121 is scanned back and forth along a line 123 relative to the surroundings. It has been found that the object motion makes it unnecessary to scan the point receiver over a two-dimensional area. The much simpler line scanning illustrated herein accomplishes the same result. The electrical output of the receiver 121 is processed in a manner similar to that described with respect to FIG. 1. Holographic information in the form of an electrical analog may be applied to a light source 124 which is scanned across a photosensitive film 125 to form a hologram from which an optical image may be reconstructed. The light source 124 is moved in the $y$ direction across the photosensitive film with a velocity corresponding to that of the receiver 121. The light source 124 moves with a velocity in the x direction which corresponds to the velocity of the object.

Figure 8:
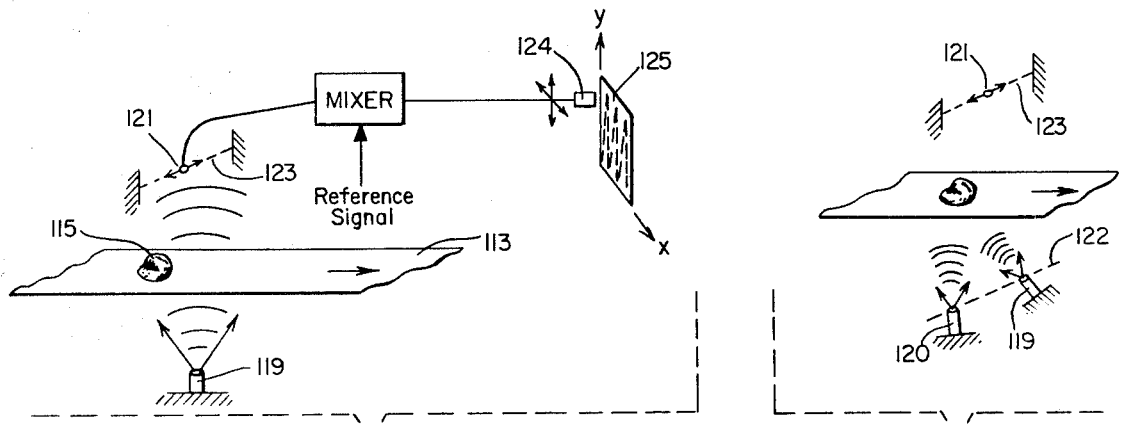
FIG. 8 illustrates the improved technique for holographic imaging of moving objects utilizing receiver scanning along a line.
Figure 8A:
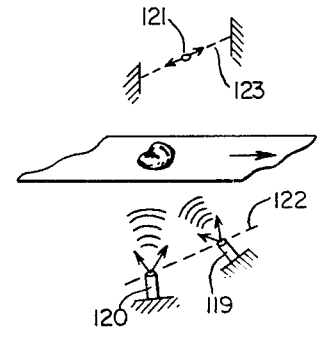
FIG. 8A shows a modification of the technique illustrated in FIG. 8.

In an alternative form, it has been found that the technique described with respect to FIG. 8 may include additional radiation sources, such as the ultrasonic radiation source 120 shown in FIG. 8A. An additional source or sources may be used to provide additional radiation intensity or to illuminate the moving objects more completely from several directions. In order not to add any distortion to the reconstructed image by the use of more than one source, all sources must be coherent and placed along a line 122 that is substantially parallel to the scanning path line 123.

Figure 9:
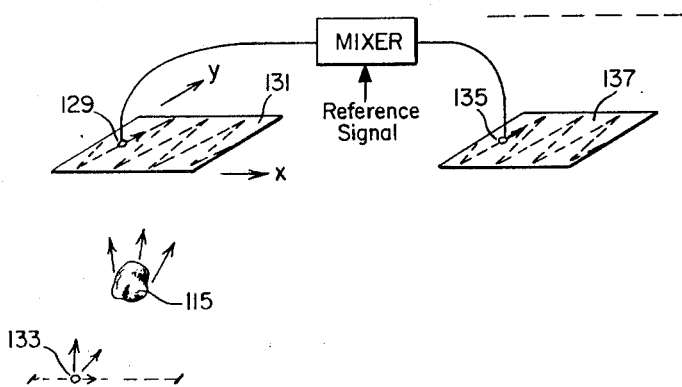
FIG. 9 illustrates area receiver scanning which generates a hologram that is the equivalent of that obtained by the process illustrated in FIG. 8.

An analysis of the scanning system illustrated in FIG. 8 may be made by reference to FIG. 9 wherein an equivalent scanning system is shown wherein the object 115 is fixed relative to its surroundings and a point receiver 129 is scanned over a two-dimensional hologram aperture 131. A substantially point radiation source 133 moves along a line in the x direction and is at all times in the same relative position along the x axis as is the radiation receiver 129. To form a hologram, an electrical signal from the receiver 129 is compared with a reference signal in an appropriate balanced mixer to generate a holographic electrical analog signal which is applied to a light source 135, or alternatively to an oscilloscope. The light source 135 is scanned over a photosensitive film 137 following the same pattern followed by the receiver 129 or a scaled replica thereof. The developed photosensitive material 137 will contain the same holographic information of the object 115 as does the photosensitive film 125. The important relationship in source and receiver scanning is between the velocities thereof relative to the object, and it may be seen by comparison of FIGS. 8 and 9 that these velocities may be made the same. For complete equality, the radiation receiver 129 has a velocity component in the y direction which is equal to the velocity of the radiation receiver 121 relative to its surroundings as it moves back and forth along the line 123. The velocity component of the radiation receiver 129 in the x direction, which is also the velocity of the radiation source 133, is equivalent to the speed at which the object 115 travels.

An image reconstructed from a hologram which has been constructed according to the techniques illustrated in FIGS. 8 or 9 will be distorted and have severe aberrations as a result of having unequal velocity ratios in the x and y directions between the source and receiver relative to the object. What happens upon reconstruction is, essentially, a reconstruction of two images spatially separated in a diffracted first-order beam, one image representing those lines of the object parallel to the x direction and the other image representing those lines of the object in the y direction.

Although such an astigmatic image may be acceptable for certain object examinations, it is generally desirable to utilize a corrective optical system during reconstruction of an image. Referring to FIG. 10, a hologram 139 is illuminated with a slightly converging coherent light beam 141 which comes to focus at a point 143. A desired first-order beam 145 diffracted by the hologram 139 brings the image to a focus at separate locations 147 and 149. One technique to correct for the abberation is to use a cylindrical lens 151 placed between the two images 147 and 149 so that the image 147 is transferred into a plane coincident with that wherein the image 149 lies without affecting the formation of the image 149. The viewer then sees an optical image of all the objects in a common plane.

A practical apparatus for carrying out the technique discussed with respect to FIG. 8 is shown in FIG. 11 wherein rotary scanning is employed. A conveyor 153 carries a series of objects under investigation, such as objects 155 and 157, by a holographic examination station. A radiation source 159 which is fixed relative to its surroundings directs a beam through the conveyor belt and objects passing therethrough. The object illuminating beam 161 is preferably collimated, which may be accomplished by the use of an acoustic lens 163. Alternatively, a collimated ultrasonic beam 161 may be generated by a flat ultrasonic transducer without need for a lens.

A scanning wheel 165 contains a plurality of point radiation receivers, each connected with appropriate information processing electronics to its own point light source on a disk 167. The line scanned by the point receivers is now a curved line 169, so it is preferable that the disk 165 be of sufficient diameter that the length of the line 169 is only a small fraction of the circumference of the disk, thereby avoiding any severe distortions due to a curved hologram aperture. To construct a hologram of the objects, a strip film 171 is moved past the rotating point light source carrying disk 167 at a speed proportional to that at which the conveyor 153 moves relative to the receiver scanning disk 165. The light sources attached to the wheel 167 are appropriately focused onto the film 171.

Use of a collimated beam 161 has two distinct advantages over use of a diverging beam. First, the energy of the object illuminating beam is concentrated and there is no energy density diminution due to a diverging beam prior to reaching the receivers. Secondly, illumination with a collimated source has the advantage that a hologram constructed thereby reconstructs directly an image of the object without astigmatism and thereby makes unnecessary correcting optics. A hologram constructed according to FIG. 11 with a collimated object illuminating beam 161 is reconstructed according to the usual technique described with respect to FIG. 7.

Certain objects may be more conveniently examined by the techniques of the present invention by rotating them about their own axis instead of moving them past a holographic examination station by a conveyor-like drive. Such a modification is illustrated in FIG. 11A wherein those elements that are the same as those shown in FIG. 11 are given the same reference numbers. An endless object 162 is rotated about its own axis 164. Within the object 162 is a point radiation source 166 which is fixed relative to the surroundings. The object 162 is oriented to rotate in a plane substantially perpendicular to the plane in which the scanning wheel 165 rotates. This technique is especially useful for ultrasonic examination of tires which are rotated one at a time as the object 162.

As will be recognized from the discussion hereinbefore, the holographic information recorded on the film 171 will reconstruct an image of the object 162 that is distorted and astigmatic. This is no problem in most examination applications but if it is, the film 171, after development, may be reconstructed as discussed with respect to FIG. 10.

So far, only holographic object examination techniques have been described. However, circular scanning generally also has application to direct imaging systems wherein a two-dimensional image of the object as seen by ultrasound may be viewed in the optical domain directly without construction of a hologram. Such a system is illustrated in FIG. 12. Unlike holographic imaging, if the ultrasonic object modified energy 173 is reflected by the object, it must be imaged onto a scanned surface 175, such as by using a high quality ultrasonic lens 177 in order to obtain an image of the object directly. Alternatively, if ultrasonic energy is transmitted through the object, the object may be placed close to the scanned surface 175 in which case an image corresponding to the ultrasonic shadow of the object is obtained. As in optics, the acoustic focal length of the ultrasonic lens 177 is chosen to image a particular plane of the object onto the scanned surface 175. It is only this plane of the object which will be translated into an optical image of sharp focus, whereas holographic techniques allow one to adjust the viewing optics upon any plane desired within a three-dimensional optical image of the object. The surface 175 is scanned by a rotating disk 179 which has a plurality of receiving transducers attached to its circumference. Each receiving transducer should be substantially a "point"; that is, small enough to obtain the desired resolution. In direct imaging, the transducers need detect only the amplitude of ultrasonic energy. The disk is translated relative to the object in a direction perpendicular to the axis of disk rotation in order to scan the two-dimensional area 175. Electrical signals developed by the receiving transducers are processed and applied to an oscilloscope which displays a visual image of the particular plane of the object which was focused by the ultrasonic lens 177 into the scanned surface 175. Alternatively, the electrical signals can be used to vary the intensity of point light sources as in FIG. 5 or 6.

In direct imaging, the surface 175 need not be scanned with lines as close together as is required in holographic imaging. Therefore, the rotating disk 179 may be translated at a higher speed across a scanned surface in direct imaging than would be acceptable in holographic imaging.

Figure 13:
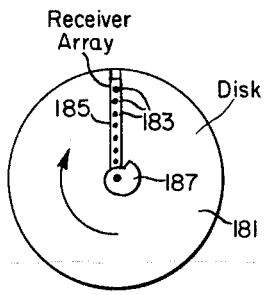
FIG. 13 illustrates a preferred form of scanning wheel for use in direct imaging with a plurality of point receivers positioned along a radial line of the disk.

Since the resolution requirement in direct imaging is less than that of holography, the surface 175 may be more conveniently scanned by a rotating disk having a plurality of receivers affixed along a radial line thereof which allows scanning a given surface area without translating the disk and thus is more rapid. Such a rotating disk is illustrated in FIG. 13. Instead of attaching a very large number of substantially point transducers along a radial line of the disk 181 to give the maximum resolution of an ultrasonic field that may be desired in a single revolution of the disk, a lesser number of point radiation receivers may be slideably attached to the disk 181 so that the entire receiver array may be moved along a radial line during the scanning process. The plurality of receivers 183 are fixed to a slide 185 which is in turn slideably attached to the disk 181 for movement back and forth along a radial line. As the disk 181 rotates, a cam 187 attached to a common driving source rotates at a speed that is some fraction of the speed of the disk. The cam 187 is shaped to push the slide 185 outward a distance equal to the distance between the evenly distributed transducers during a given number of disk revolutions and then returned to its center most position as shown in the FIG. 13. Such a configuration has the additional advantage that the resolution in the optical image may be controlled by controlling the relative rotational speeds of the disk 181 and the cam 187. For instance, low resolution searching, such as in an underwater viewing application, may be accomplished without moving the slide 185 until an object is desired to be examined in greater detail. Then, the cam 187 could be rotated at some appropriate speed to resolve the object of interest.

Figure 14:
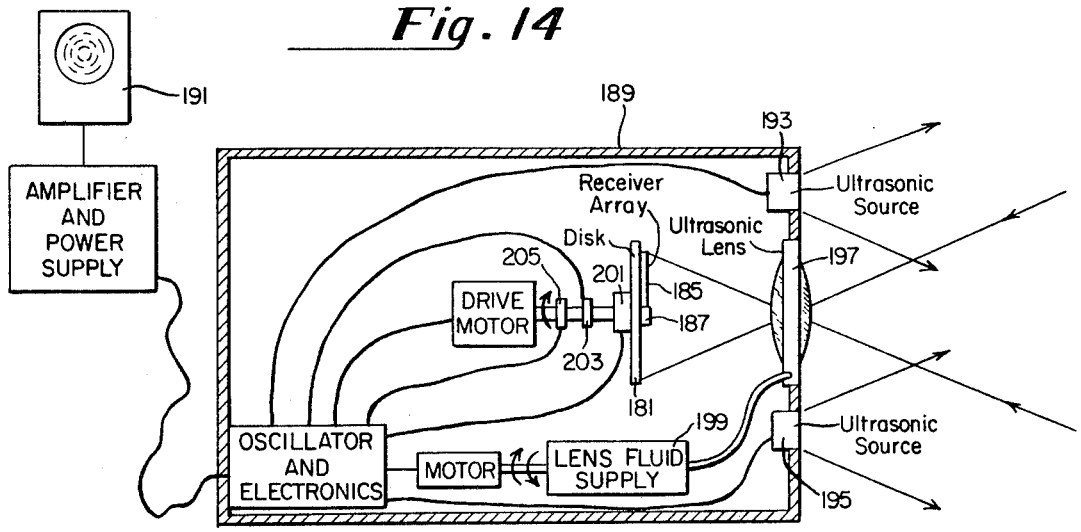
FIG. 14 schematically illustrates an underwater direct imaging viewer.

Such a scanning apparatus for direct viewing is illustrated in FIG. 14 in the form of an underwater viewer which may be lowered into an ocean or river from a boat. The underwater apparatus is contained within a housing 189 and is connected by a cable to a land or ship control position wherein necessary electronics and power supply are located along with an oscilloscope 191 for displaying an image of the underwater area as viewed with ultrasonic energy. The underwater viewer contains a plurality of ultrasonic sources 193 and 195 for illuminating the area to be viewed. Reflections from objects are focused by an ultrasonic lens 197 into a plane which is scanned by the receiving transducers 183. The ultrasonic lens 197 may be any convenient type but is preferably of the form described in some detail hereinafter. The preferred lens includes two sheets of thin flexible material filled therebetween with a fluid of a proper ultrasonic refractive index relative to that of water. The focal length of the lens 197 is made adjustable by providing a variable lens fluid supply 199 which can add to or take from the liquid within the lens 197 and thus change the radius of curvature of the thin flexible outer sheets. The lens fluid supply may be driven by an appropriate small motor which may be energized and controlled from above water.

The disk 181 is rotated by an appropriate drive motor at a uniform angular velocity. An appropriate gear reduction assembly 201 transforms this motion to an appropriate drive of the cam 187 which may be controlled from above water. The electronic signals developed by a plurality of point receivers are transmitted from the rotating disk by slip rings 203 to the oscilloscope 191 above water which displays an optical image of the acoustic image scanned by the receiving transducers. Included in the electronic processing of these signals is a sampling circuit which allows the oscilloscope to alternatively sample the various point receivers and reconstruct an image on the face of the oscilloscope CRT. As a matter of simplifying transfer of the signals from the rotating disk to the oscilloscope, it may be desirable to multiplex the signals developed by each of the point receivers onto a common carrier for transfer above water where the signal may be demodulated for driving the oscilloscope 191. A position potentiometer 205 provides the necessary signals for the oscilloscope electron beam scanning circuits.

Figure 15:
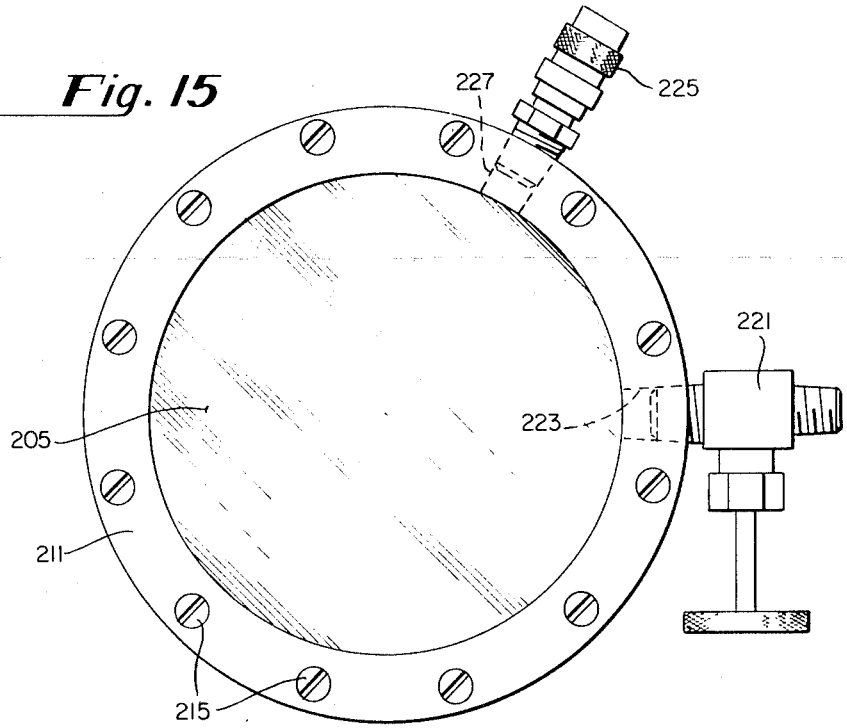
FIGS. 15 and 15A show a preferred construction of the ultrasonic lens used in FIG. 14.
Figure 15A:
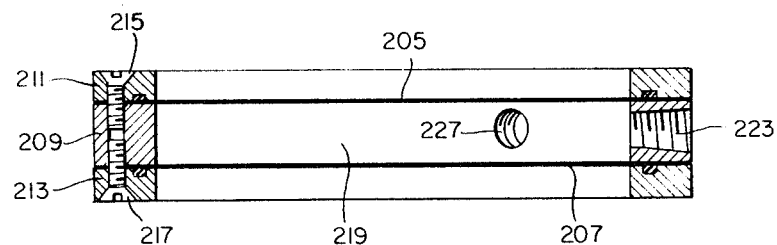

Quality ultrasonic imaging with a system according to FIG. 14 depends in large part upon the quality of the ultrasonic lens 197. A preferred construction of an ultrasonic lens is discussed in the aforementioned copending patent application Ser. No. 730,260 and is summarized herein with reference to FIGS. 15 and 15a. Two thin sheets of flexible synthetic polymeric film 205 and 207 are stretched across an innersupporting ring 209 and firmly clamped thereto by outersupporting rings 211 and 213. The outer ring 211 is securely clamped to the innersupporting ring by appropriate screws 215 and, likewise, the outer ring 213 is securely clamped to the innersupporting ring 209 by screws 217. The cavity 219 formed between the innersupporting ring and the two thin films is filled with an appropriate ultrasonic refracting liquid medium with a volume to cause the thin flexible films 205 and 207 to bow outward and thus form a double convex lens of a focal length which is dependent upon the radius of curvature of the bowed thin films 205 and 207. The film 205 and 207 should be stretched to a stress level high within the material's elastic region by a combination of stretching the films across the innersupporting ring 209 before clamping them thereto and the bowing outward of the films by introducing a liquid into the cavity 219 of a volume greater than that of the unfilled cavity. The stress level of the thin films is important since it determines whether the films will form the liquid fill into a uniform spherical surface without substantial irregularities and surface deformations which cause distortions in the ultrasonic image formed thereby.

A preferred liquid for filling the cavity 219 is trichloro-trifluoro-ethane which has an acoustic index of refraction of 2.07 relative to that of water and is a good acoustic match with water for low reflection losses. The liquid may be introduced into the cavity 219 through a needle valve 221 which is threadedly attached to an opening 223 within the innersupporting ring 209. As fluid flows through this valve into the cavity, air may be let out by opening a bleeder valve 225 which is threadedly attached to the innersupporting ring 209 at an opening 227. For low energy losses in the lens, the thin films 205 and 207 should either be less than ¼ wavelength of the ultrasound in the film material or should be an integral number of ½ wavelengths thereof.

Figure 16:
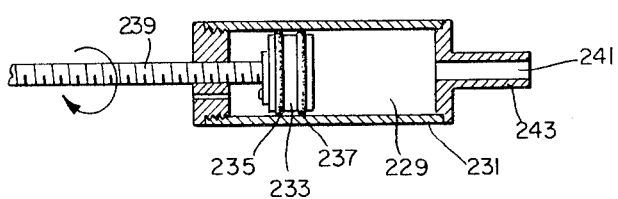
FIG. 16 shows a preferred form of the lens fluid supply cylinder utilized in FIG. 14.

FIG. 16 illustrates a plunger which may be used for controlling the amount of fluid placed into the lens cavity, and thereby control the focal length of the lens. A chamber 229 is formed by a housing 231 which includes a plunger 233 having O-rings 235 and 237 to form a proper seal. A shaft 239 threadedly attached to an end of the housing 231 provides reciprocal power to the plunger 233 to force liquid out of the chamber 229 through an opening 241 in a tube 243. This plunger assembly is connected through the tube 243 to the needle valve assembly 221 to provide control of the volume of fluid within the lens cavity 219.

Figure 17:
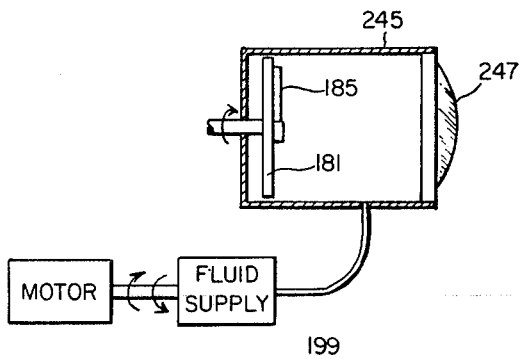
FIG. 17 shows a unitary scanning disk and lens assembly which may be alternatively used in the underwater viewer of FIG. 14.

In the underwater viewer of FIG. 14, some ultrasonic transmitting liquid must be placed within the housing 189 for transmission of ultrasonic energy from the lens 197 to a plane scanned by the receiver array 185 without significant losses. This liquid could be the liquid in which the underwater viewer is being utilized or could be water permanently contained therein. As a alternative construction, a subassembly combining the ultrasonic lens and the scanning disk and receiver array such as that shown in FIG. 17 could be inserted within an underwater viewer similar to that of FIG. 14. Within the subassembly housing 245, an appropriate lens fluid couples a thin flexible film 247 with the receiver array 185 which is scanned at one end of the subassembly by attachment to the disk 181, as hereinbefore described. Lens fluid supply 199 is adjustable to control the volume of lens fluid within the subassembly housing 245 and thus would control the degree of curvature of the flexible thin film 247, thereby to control the focal length of the single face ultrasonic lens.

Figure 18:
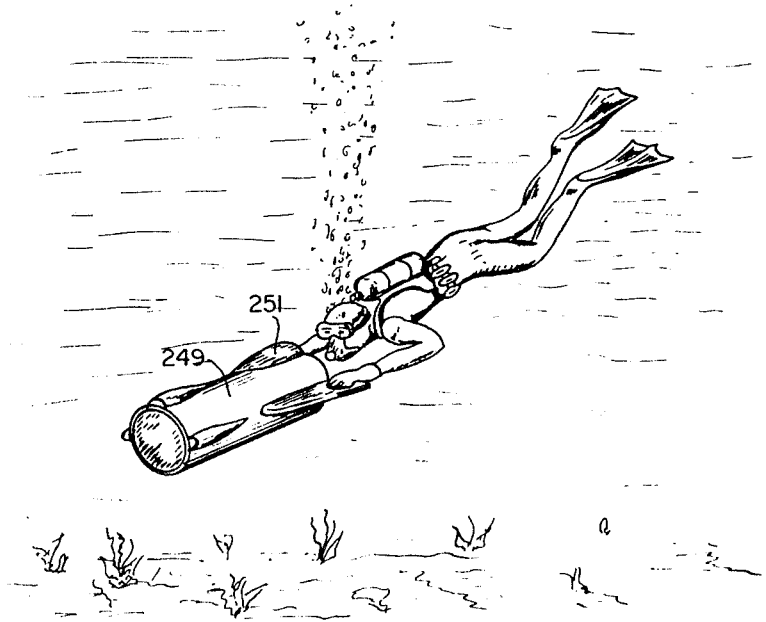
FIG. 18 illustrates the use of a hand-held self-contained underwater viewer which includes all the elements illustrated for the underwater viewer of FIG. 14.

Referring to FIG. 18, the use of a hand held ultrasonic underwater viewer 249 for extending the visual range of a diver in murky or dark waters is illustrated generally. The underwater viewer 249 contains all of the elements described with respect to FIG. 14 packaged in a convenient manner. As oscilloscope CRT is contained in the viewer 249 in its hooded portion 251 for observation by the diver.

What is claimed is:

1. A method of obtaining information of an object, comprising the steps of:
   directing radiation toward said object in a manner to produce object-modified radiation,
   scanning a substantially point radiation receiver in a circular path about an axis of rotation to detect the object-modified radiation, and
   providing relative motion between the object and the axis of rotation in a manner that the receiver sweeps out a defined surface area relative to the object.

2. The method according to claim 1 wherein the relative motion between the receiver axis of rotation and the object is substantially parallel to the axis.

3. The method according to claim 1 wherein the relative motion between the receiver axis of rotation and the object is substantially orthogonal to the axis.

4. The method according to claim 1 wherein the step of directing radiation toward the object includes simultaneously scanning a substantially point radiation source in substantially the same circular path scanned by said radiation receiver.

5. The method according to claim 1 wherein the step of scanning said receiver includes reading the receiver only during a portion of each revolution while said receiver is within said defined surface area.

6. The method according to claim 1 wherein the step of scanning the receiver includes scanning a plurality of substantially point receivers in a circular path about an axis of rotation wherein each receiver is read only during the same predetermined portion of each revolution as each receiver travels across one dimension of said defined surface area over which the receiver sweeps relative to the object.

7. A method of obtaining holographic information of a object, comprising the steps of:
   obtaining information of the object by the method according to claim 1 wherein coherent object illuminating radiation is used, and
   comparing object-modified radiation detected by said receiver with the phase and intensity of a coherent reference waveform coherent with the object illuminating radiation.

8. A method of obtaining holographic information of an object, comprising the steps of:
   scanning at least one substantially point radiation source in a circular path about an axis of rotation to illuminate the object, thereby producing object-modified radiation,
   detecting the object-modified radiation, and
   providing relative motion between the object and the axis of rotation in a manner that the source sweeps out a surface area relative to the object.

9. The method according to claim 8 wherein the step of detecting the object-modified radiation includes placing a substantially point radiation receiver in the path of the object-modified radiation.

10. The method according to claim 8 wherein the step of detecting the object-modified radiation includes comparing said detected object-modified radiation with the phase and intensity of a reference waveform, said reference waveform being coherent with the object illuminating radiation.

11. Apparatus for obtaining information of an object by scanning, comprising:
    a substantially point radiation source,
    a substantially point radiation receiver,
    means for rotating at least one of said radiation source and receiver in a circular path about an axis of rotation, and
    means for providing relative motion in one direction between the object and said axis of rotation.

12. Apparatus according to claim 11 wherein said means for providing relative motion includes means to drive said object in substantially a straight line.

13. Apparatus according to claim 11 wherein said means for rotating at least one of the radiation source and receiver includes a rotating wheel.

14. Apparatus according to claim 13 wherein said means for providing relative motion includes means for translating said wheel in a direction along its axis of rotation.

15. Apparatus according to claim 13 wherein said means for providing relative motion includes means for translating said wheel in a direction substantially orthogonal to said axis of rotation.

16. Apparatus for obtaining information of an object by scanning, comprising:
    a radiation source for illuminating the object, thereby producing object-modified radiation,
    a wheel,
    means for rotating said wheel about its axis of rotation,
    a plurality of substantially point radiation receivers attached to said wheel in a circle having a center substantially coincident with said axis of rotation, and
    means for providing relative motion in a single direction between the object and said axis of rotation.

17. Apparatus according to claim 16 wherein said means for providing relative motion includes means for translating said wheel along its axis of rotation.

18. Apparatus for obtaining halographic information of an object by receiver scanning, comprising:
    scanning apparatus according to claim 16,
    an electrical oscillator operably connected to drive said radiation source, and
    electronic means connected to said radiation receivers and to said oscillator for comparing the phase and intensity of the received radiation with the oscillator output as a reference, whereby the output of said electronic means is a holographic information analog electrical signal.

19. Apparatus for directly imaging an object by receiver scanning, comprising:
    scanning apparatus according to claim 16,
    means placed in the path of said object-modified radiation for imaging the object into a defined surface area scanned by said receiver, and means for displaying a visual image of the object in response to electrical output signals of said receivers.

20. Apparatus according to claim 16 wherein said radiation receivers are uniformly spaced around said circle.

21. Apparatus according to claim 20 wherein the number of radiation receivers is sufficient so that the uniform distance therebetween is equal to or less than a distance of a defined scanning surface area through which the radiation receivers travel.

22. Apparatus for obtaining information of an object by scanning, comprising:
a radiation source for illuminating the object, whereby object-modified radiation may be produced,
a wheel,
a plurality of substantially point radiation receivers attached to said wheel at selected radii, and
means for translating said radiation receivers radially during rotation of the wheel.

23. Apparatus for obtaining information of an object by scanning, comprising:
a radiation source for illuminating the object, whereby object-modified radiation may be produced,
a wheel,
means for rotating said wheel,
a plurality of substantially point radiation receivers attached to said wheel at selected radii, wherein said point radiation receivers are uniformly spaced upon a slide which is movable with respect to the wheel along a radial line thereof, and which additionally comprises a cam operably connected to said slide so that upon rotation of said wheel the slide moves along the radial line thereof.

24. Apparatus according to claim 23 wherein the surface of said cam is shaped to move said slide a distance substantially equal to the spacing between said radiation receivers at a uniform speed relative to the wheel.

25. An underwater ultrasonic viewer, comprising:
a source of ultrasonic energy directed to illuminate a volume in front of said viewer,
an ultrasonic lens positioned to image onto a scanning surface the ultrasonic energy reflected by objects within said volume,
a rotatable disk positioned within said viewer coincident with said scanning surface, and
a plurality of substantially point ultrasonic transducers attached to said disk at selected radii.

26. An underwater ultrasonic viewer according to claim 25 wherein said ultrasonic lens includes an ultrasonic energy refracting fluid in a container having at least one thin flexible ultrasonic energy transmitting film, and which viewer additionally comprises means to control the volume of said fluid, whereby the radius of curvature of said at least one thin film is controlled.

27. An underwater ultrasonic viewer according to claim 25 which additionally comprises means for translating said ultrasonic transducers along a radial line when said disk is rotated.

28. An underwater ultrasonic viewer according to claim 27 wherein said means for translating said ultrasonic transducers includes means to control the time in terms of revolutions of said disk that it takes for said transducers to travel at uniform speed a distance substantially equal to the spacing between transducers, whereby resolution may be controlled.

29. Apparatus for holographic inspection of a sequence of objects, comprising:
at least one substantially point radiation receiver,
a radiation beam source,
means for rotating said at least one radiation receiver in a circular path about a fixed axis of rotation to intercept a portion of said radiation beam after modification by one of the objects, and
conveyor means for carrying the objects sequentially through the radiation beam and substantially parallel with said fixed axis of rotation.

30. Apparatus according to claim 29 wherein said source remains fixed relative to said axis of rotation.

31. Apparatus according to claim 30 wherein said objects are passed through a substantially collimated radiation beam.

32. A method of obtaining information of an endless object having an axis of rotation, comprising the steps of:
rotating the endless object in a plane about its own axis,
directing coherent radiation from within said endless object in such a manner as to pass through said object to generate object-modified radiation, and
rotating a plurality of radiation receivers in a plane substantially perpendicular to the plane in which said object is rotating to detect the object-modified radiation.

33. Apparatus for holographic inspection of a sequence of objects, comprising:
at least one substantially point radiation receiver,
a radiation beam source,
means for rotating said at least one radiation receiver in a circular path about an axis of rotation to intercept a portion of said radiation beam after modification by one of the objects, said source remaining fixed relative to said axis of rotation, said means for rotating said at least one radiation receiver including a wheel with said at least one radiation receiver attached to its rim, and
means for moving the objects sequentially through the radiation beam, said means for moving the objects rendering the movement of objects substantially parallel with said axis of rotation.

References Cited
UNITED STATES PATENTS

| | | | |
|---|---|---|---|
| 2,830,487 | 4/1958 | Griffith | 250—236 X |
| 3,134,902 | 5/1964 | Chase et al. | 250—236 X |
| 3,144,646 | 8/1964 | Breithaupt | 343—113 DE |
| 3,372,392 | 3/1968 | Beukers | 343—113 DE |
| 3,410,363 | 11/1968 | Schwartz | 181—0.5 APM |
| 3,461,420 | 8/1969 | Silverman | 340—5 H |
| 3,467,216 | 9/1969 | Massey | 181—0.5 |
| 3,533,056 | 10/1970 | Clark | 340—5 H |
| 3,488,656 | 1/1970 | Anderson | 343—17 |

OTHER REFERENCES

"Acoustic Holography in Air with an Electronic Reference" by G. A. Massey, Proceedings of IEEE, June 1967, pp. 1115–1117.

"Acoustical Holography of Nonexistent Wavefronts Detected at a Single Point in Space," by A. F. Metherell et al., applied Physics Letters, July 1968, vol. 13, No. 1, pp. 22–24.

MALCOLM F. HUBLER, Primary Examiner

U.S. Cl. X.R.

73—67.5 H; 181—0.5 AP, 0.5 J; 250—236; 340—5 H; 350—3.5; 356—167